United States Patent [19]

Kuo

[11] Patent Number: 5,520,339

[45] Date of Patent: May 28, 1996

[54] MULTI-STAGE DRIPPING TUBE FOR IRRIGATION

[76] Inventor: Ming-Shish Kuo, 26-1, Alley 43, Lane 344, Jong Jeng Road, Yung-Kang, Tainan Shien, Taiwan

[21] Appl. No.: 354,959

[22] Filed: Dec. 13, 1994

[51] Int. Cl.$^6$ ........................................ B05B 1/20
[52] U.S. Cl. ............................. 239/542; 239/556
[58] Field of Search ........................ 239/542, 547, 239/273, 11, 272, 565, 556; 138/26, 42

[56] References Cited

U.S. PATENT DOCUMENTS

| | | | |
|---|---|---|---|
| 3,792,588 | 2/1974 | Gilaad | 239/542 |
| 4,763,842 | 8/1988 | Dunn | 239/542 |
| 5,106,021 | 4/1992 | Gilead | 239/542 |

Primary Examiner—Andres Kashnikow
Assistant Examiner—Lesley D. Morris

[57] ABSTRACT

A multi-stage dripping tube for irrigation comprising a main tube having an elongate flat plate portion, which has small dripping tubular passageways formed lengthwise in its interior, each small dripping tubular passageway having a plurality of drip stream portions connected with one after another, each drip stream portion consisting of a pressure-falling section bent up and having a smaller diameter than horizontal sections, a first horizontal flowing section behind the pressure-falling section, a blocking section bent down and of a small diameter than horizontal sections behind the first horizontal flowing section, a second horizontal section behind the blocking section, and a sealed outlet at the end of each drip stream portion, one of the outlets selectably cut open for proper volume of water to drip out for irrigating seedlings, saplings, young plants, etc.

1 Claim, 4 Drawing Sheets

MULTI-STAGE DRIPPING TUBE FOR IRRIGATION

This invention concerns a dripping tube for irrigation particularly one provided with multi-stage drip stream portions which have a sealed outlet at each end of each drip stream portion, with and one of the sealed outlet being selectably cut open for proper volume of water to drip out for watering seedlings, young plants, etc.

A known conventional irrigation tube shown in FIG. 1 comprises a main tube 10 and a sidewise elongate flat plate 11, and a plurality of zigzag small dripping tubes 12 provided lengthwise on the plate 11. Each small dripping tube 12 has its beginning commucating with the main tube 10 and an outlet at the end for water flowing out of the main tube 10 to be pushed out with a pressure by a pump to water seedlings, young or full-grown various plants.

However, this known conventional irrigation tube is considered to have the following defects.

1. Although each small dripping tube 12 has function of reducing fluid pressure, its effectiveness is limited, so water flowing out of the outlet 13 may be jetted out to drown dead small seedlings because of too much volume of water.
2. The outlet 13 of each dripping tube 12 is located at a definite point and the volume flowing out of every outlet 13 is also the same, which makes it impossible to select different volume of water to water seedlings, plants, etc.
3. The volume of water flowing out of every outlet cannot be increased despite of seedlings and plants having grown larger than before.

SUMMARY OF THE INVENTION

A main object of the present invention is to offer a multi-stage dripping tube for irrigation, in which it is possible to select one of a number of sealed outlets to let different volumes of water to drip out for watering seedlings, plants, etc.

The main feature of this invention is a plurality of small dripping tubular passageways formed in a flat elongate plate portion extending sidewise from a main tube. The beginning of each dripping tubular passageway communicates with the main tube, and has a sealed outlet at the end. Each small dripping tubular passageway has a plurality of drip stream portions of a nearly zigzag shape consisting of two horizontal sections, a pressure-failing section and a blocking section so that water flowing from the main tube in the drip stream portions may lose most of its pressure to drip instead of jet out of a chosen and cut-open sealed outlet provided at the end of each drip stream portion, with a proper volume of water needed dripping out.

DETAILED DESCRIPTION OF THE INVENTION

Figure 1:
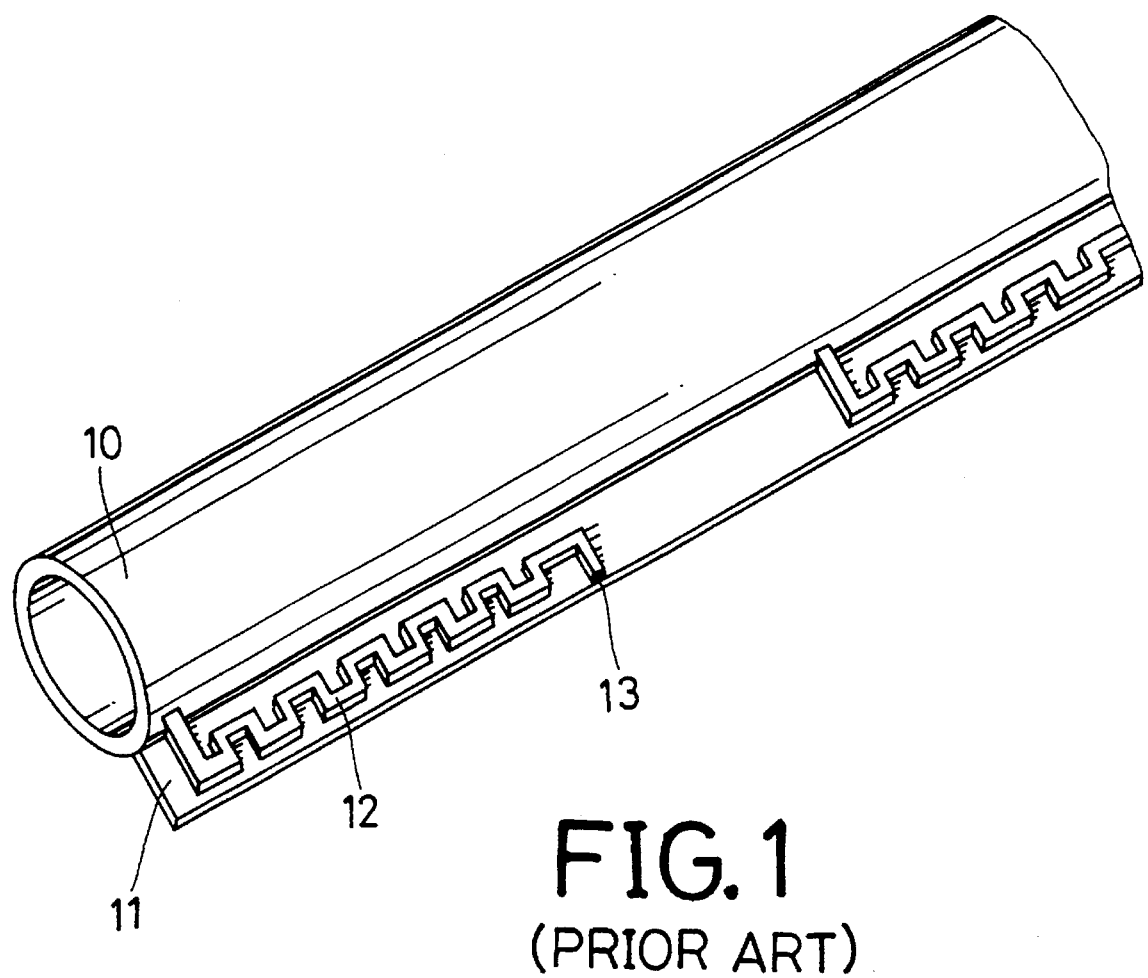
FIG. 1 is a perspective view of a known conventional dripping tube for irrigation.
Figure 2:
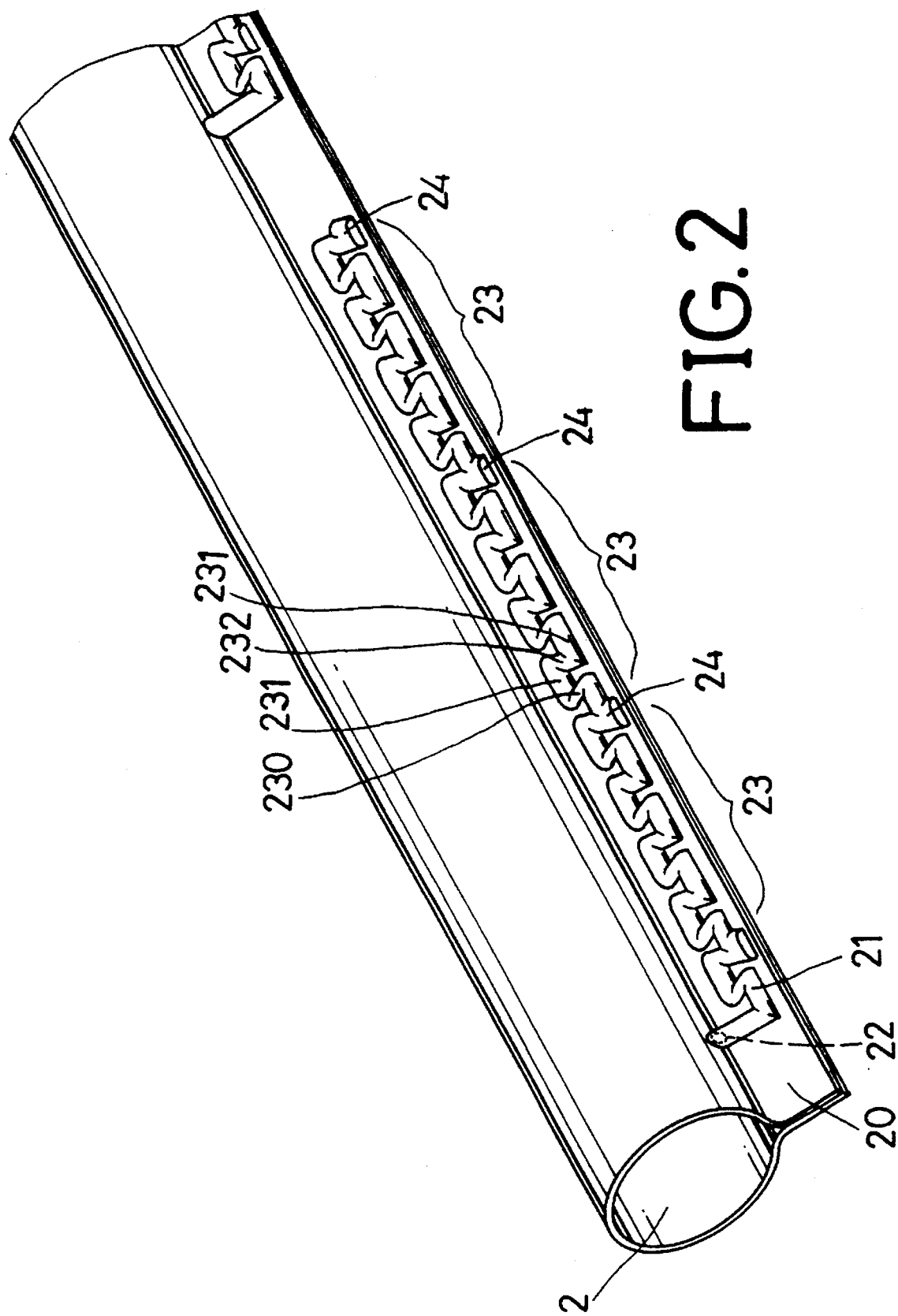
FIG. 2 is a perspective view of a multi-stage dripping tube for irrigation in the present invention.
Figure 3:
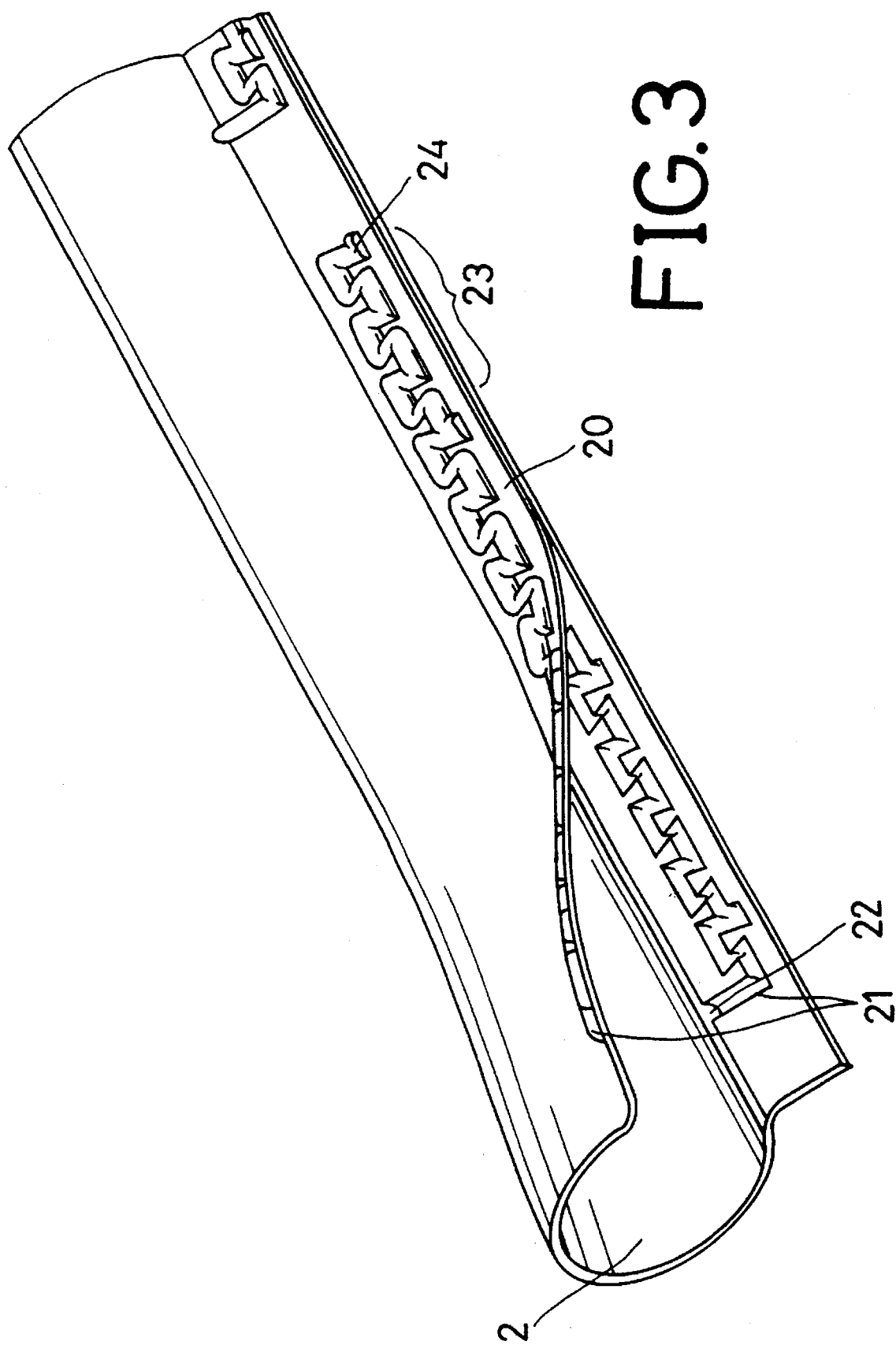
FIG. 3 is a perspective view of the multi-stage dripping tube for irrigation, showing how a sidewise elongate flat plate portion is formed.
Figure 4:
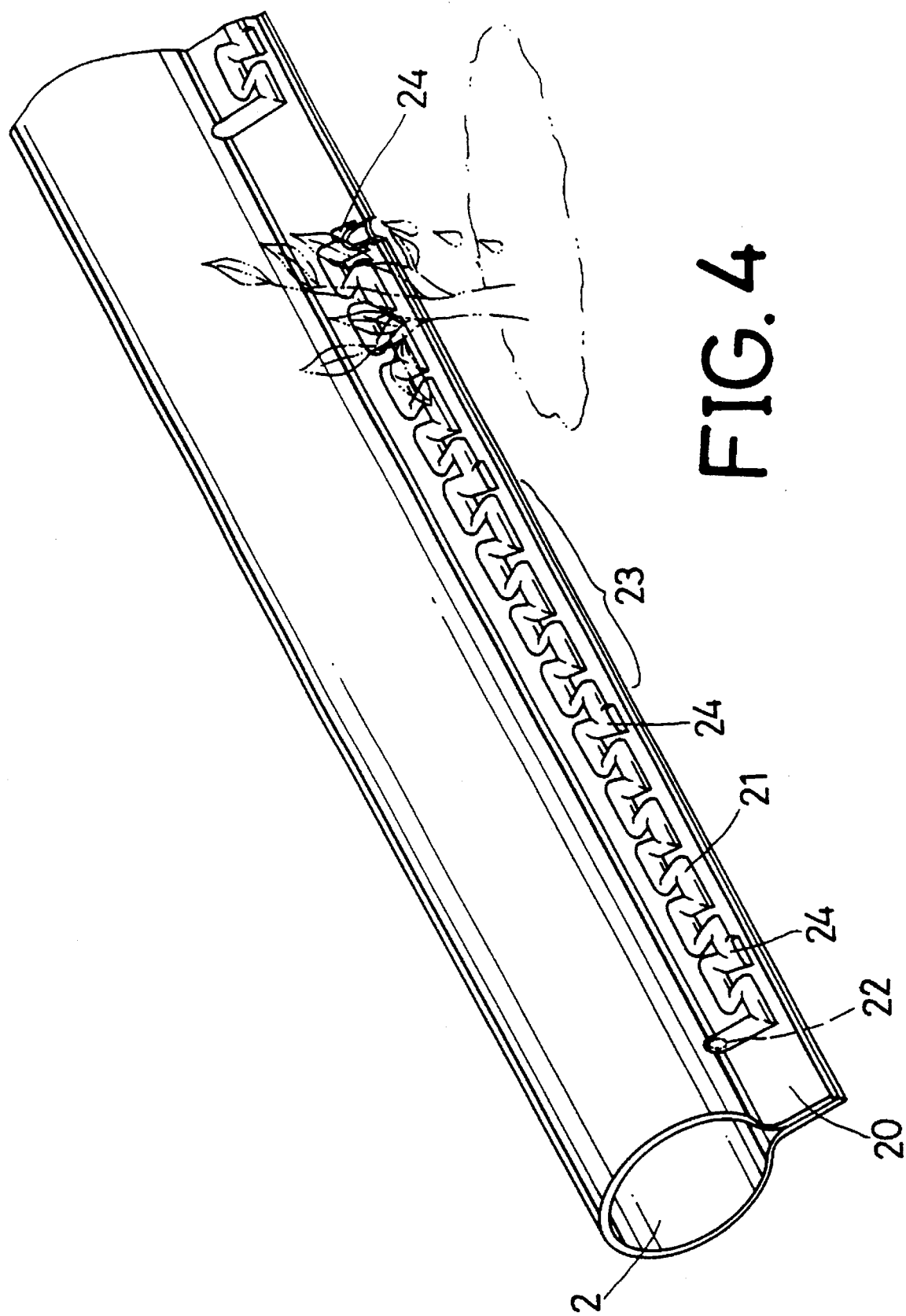
FIG. 4 is a perspective view of the multi-stage dripping tube for irrigation in the present invention, showing it used to drip water from one of its outlets.

A multi-stage dripping tube for irrigation in the present invention, as shown in FIGS. 2 and 3, comprises a water main tube 2, and an elongate flat plate 20 extending sidewise from the main tube 2. The flat elongate plate 20 has a plurality of .small dripping tubular passageways 21 of a nearly zigzag shape formed lengthwise in the interior of the the plate 20, and a water inlet 22 is provided at the beginning of each passageway 21 to communicate with the main tube 2. Each small dripping passageway 21 has a plurality of drip stream portions 23, which respectively consist of a pressure-falling section 230 of a smaller diameter than horizontal sections and bent slantingly up, a first horizontal flowing section 231 behind the pressure-falling section 230, a blocking section 232 of a smaller diameter than horizontal sections 231 and bent slantingly up and a second horizontal flowing section 231 behind the blocking section 232. The drip stream portions 23 are continuously connected with one another, having a water outlet 24 projecting downward and sealed at each end of the drip stream portions 23.

For clearer understanding of the small dripping tubular passageways 21, referring to FIG. 3, the elongate flat plate 20 is made of two elongate flat plate portions extending sidewise from the main tube 2 and fused together, and each of the two plate portions are respectively formed with a plurality of protruding-out half dripping passageways to make up the small dripping tubular passageways 21 after the two plate portions are fused together.

When one end of the tube 2 is connected with a water source, water from the source may flow through the main tube 2 to go into each of the small dripping tubular passageways 21 through the inlet 22, with the water pressure reduced by the pressure-falling section 230 of each drip stream portion 23 and flowing through the two horizontal flowing sections 231, 231 of each drip stream portion 23 and then again reduced in its pressure by the blocking section 232 of each drip stream portion 23. Thus the water flowing through each small drippping tubular passageway 21 gradually loses its pressure and its volume also gradually reduces. Then a user selects one of the outlets 24 and cuts it open to let water drip out therethrough, depending on the size of the seedlings or the plants to be watered. Then the water leaving the outlet 24 may flow around the seedlings, the plants, etc, without drowning them with to much volume of water furnished. As the seedlings or the plants are growing larger and larger, the outlet 24 nearest to the water inlet 22 may be selected and cut open to let more water drip therethrough to provide a larger volume than before, this meeting the need of the growing plants, without needing the use of a water pump. In case fertilizer or insecticide is needed to be furnished to the plants, it can be dissolved in water and then flowed through the main tube 2.

It is evident from the description above that this invention has advantages as follows.

1. An outlet of a large or small volume of water in each dripping tubular passageway can be chosen for corresponding to the practical size of seedlings, saplings, young or full-grown plants.
2. A larger outlet can be chosen after seedlings grows larger.
3. Proper volume of water through one of a plurality of outlets can be selectively acquired without the help of a water pump.

What is claimed is:

1. A multi-stage dripping tube for irrigation comprising a main tube body having an elongate flat plate portion extending sidewise from the main tube body, said elongate plate portion having a plurality of nearly zigzag small dripping tubular passageways formed lengthwise in an interior, a water inlet provided at a beginning of each small tubular passageway and communicating with said main tube body, and wherein each of said small dripping tubular passageways has a plurality of drip stream portions continuously connected one after another, with each drip stream portion having a pressure-falling section bent slantingly up followed by a first horizontal flowing section, a blocking section bent slantingly down, and then a second horizontal flowing section, said pressure-falling section having a smaller diameter than the horizontal sections, each drip stream portion has a sealed water outlet protruding downward at an end, said sealed water outlets being chosen one by one to be cut open for water to drip out in proper volume for irrigating seedlings, young or full-grown plants.

* * * * *